United States Patent

Maeda

[11] Patent Number: 5,832,281
[45] Date of Patent: *Nov. 3, 1998

[54] POWER CONTROL APPARATUS AND POWER CONTROL METHOD

[75] Inventor: Kenji Maeda, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 544,193

[22] Filed: Oct. 17, 1995

[30] Foreign Application Priority Data

Oct. 19, 1994 [JP] Japan ................................. 6-253477

[51] Int. Cl.⁶ .................................................. G06F 1/26
[52] U.S. Cl. ....................................................... 395/750.01
[58] Field of Search ............................. 395/750, 750.01, 395/750.08

[56] References Cited

U.S. PATENT DOCUMENTS

| | | | |
|---|---|---|---|
| 4,485,423 | 11/1984 | Hattori et al. ............................. | 361/92 |
| 5,355,490 | 10/1994 | Kou ......................................... | 395/750 |
| 5,375,246 | 12/1994 | Kimura et al. ........................... | 395/750 |
| 5,511,202 | 4/1996 | Combs et al. ........................... | 395/750 |
| 5,548,763 | 8/1996 | Combs et al. ........................... | 395/750 |
| 5,581,772 | 12/1996 | Nanno et al. ........................... | 395/750 |
| 5,598,567 | 1/1997 | Ninomiya ................................ | 395/750 |
| 5,603,038 | 2/1997 | Crump et al. ........................... | 395/750 |

Primary Examiner—Ayaz R. Sheikh
Assistant Examiner—David A. Wiley
Attorney, Agent, or Firm—Fitzpatrick, Cella, Harper & Scinto

[57] ABSTRACT

An information processing apparatus includes a power control apparatus. When the information processing apparatus enters a suspension state, data necessary for resuming the apparatus is stored. The data is recovered when the battery for the apparatus is replaced. The power control apparatus has a reset circuit and a detection circuit for detecting the on or off state of the power switch. The detection circuit includes memory for controlling the main power. When the battery is replaced, the main power is turned off and the memory is forcibly initialized depending on the state of the power switch.

18 Claims, 13 Drawing Sheets

POWER CONTROL APPARATUS AND POWER CONTROL METHOD

BACKGROUND OF THE INVENTION

1. Field of the Invention

The present invention relates to a power control apparatus for an information processing apparatus and its method of use and, more particularly, to a power control apparatus for an information processing apparatus having a resume function and its method of use.

2. Description of the Related Art

A conventional information apparatus, especially a notebook personal computer (PC) which can be used with either an AC adaptor or a battery, has a suspend function for temporarily storing data during idling in order to reduce power consumption during idling and to eliminate complicated cold booting procedures at power on. In order to save in a hard disk all data used before idling, an area for storing the data has to be assigned and set in advance. It is also necessary to store data, such as suspend information including state flags and their storage-area data, in memory driven by a battery in order to provide expandability of the main memory and to handle defective portions of an HDD, such as bad sectors and recovery-impossible errors.

In addition, to detect the states of a power switch and a suspend/resume switch while the main system power is off, it is required to have a detection circuit having memory and registers, driven by supplementary power, a battery, for monitoring the states of the switches.

Since an area storing the suspend information, such as state flags and their storage-area data, and the power detection circuit are driven by a battery in the information apparatus, the information is lost when the battery is replaced. If the state flags and their storage-area data are lost, the following phenomena occur:

(1) When a new battery is mounted in the body in a battery replacement operation, if the power switch is set to the on position, the power is turned on.

(2) If the power switch is operated before a new battery is mounted in the body in a battery replacement operation:

(A) When the power switch is turned on from the off state, a new battery is mounted, and the resume switch is pressed, cold booting starts;

(B) When suspension has been directed while the power switch is on, if the power switch is turned off from the on state, the battery is replaced, and the switch is turned on, the system resumes.

As described above, the system may operate against the user's intention, for example, the system may be turned on, or the system may resume, when the battery is replaced.

SUMMARY OF THE INVENTION

Accordingly, it is an object of the present invention to provide a power control apparatus and power control method which allow data to be recovered if resume data and other data items are destroyed due to erroneous user operations or battery exhaustion.

Another object of the present invention is to provide a power control apparatus and power control method which enable a resume operation to be positively executed and the user to be notified of memory failure at battery replacement, by storing suspend information into non-volatile memory.

The above objects of the present invention are achieved through the provision of a power control apparatus comprising: power control means for controlling power from a first power source supplied to an information processing apparatus; a second power source for driving the power control means; and delay means for delaying the operation of the power control means when the second power source is turned on, wherein the power from the first power source is controlled according the state of the power switch of the information processing apparatus when the second power source is turned on.

The above objects of the present invention are also achieved through the provision of a power control method for an information processing apparatus having power control means for controlling power from a first power source supplied to the information processing apparatus and a second power source for driving the power control means, wherein the operation of the power control means is delayed when the second power source is turned on, and the power from the first power source is controlled according to the state of the power switch of the information processing apparatus.

BRIEF DESCRIPTION OF THE DRAWINGS

FIG. 10 is a flowchart showing the operation of a system at power on.

DETAILED DESCRIPTION OF THE PREFERRED EMBODIMENT

Figure 1:
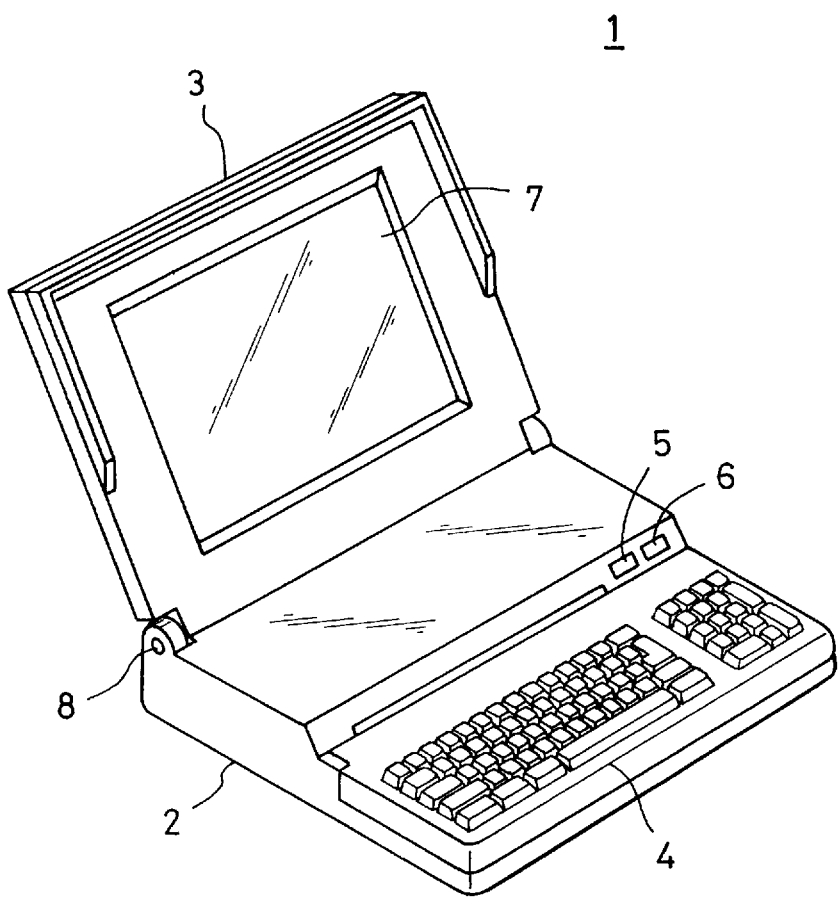
FIG. 1 is a perspective view of an information processing apparatus according to an embodiment of the present invention.

FIG. 1 is a perspective view illustrating a personal computer (hereinafter called PC) serving as an information processing apparatus according to a first embodiment of the present invention.

The PC 1 comprises a body 2, a keyboard 4, and an upper cover 3 having a display section 7. The upper cover 3 is mounted to the body 2 such that it can be swingable about a hinge 8 provided at each end of the rear edge of the upper cover 3. With this configuration, the upper cover 3 is opened to a position where the display section 7 is easy to see when the PC 1 is used and is closed to serve as a cover when the PC 1 is not used.

As a display device for the display section 7, a liquid-crystal display device can be used, which makes the display section 7 thin. A power switch 5 for the PC 1 is used to turn on or off the power. A suspend/resume switch (hereinafter called a suspend SW) 6 is used to set the PC 1 to a suspend condition in which data being handled is saved and the power consumption of the PC 1 is reduced, or to a resume condition in which the stored data to be handled is read and the state is recovered to that before the PC has entered the suspend condition.

Figure 2:
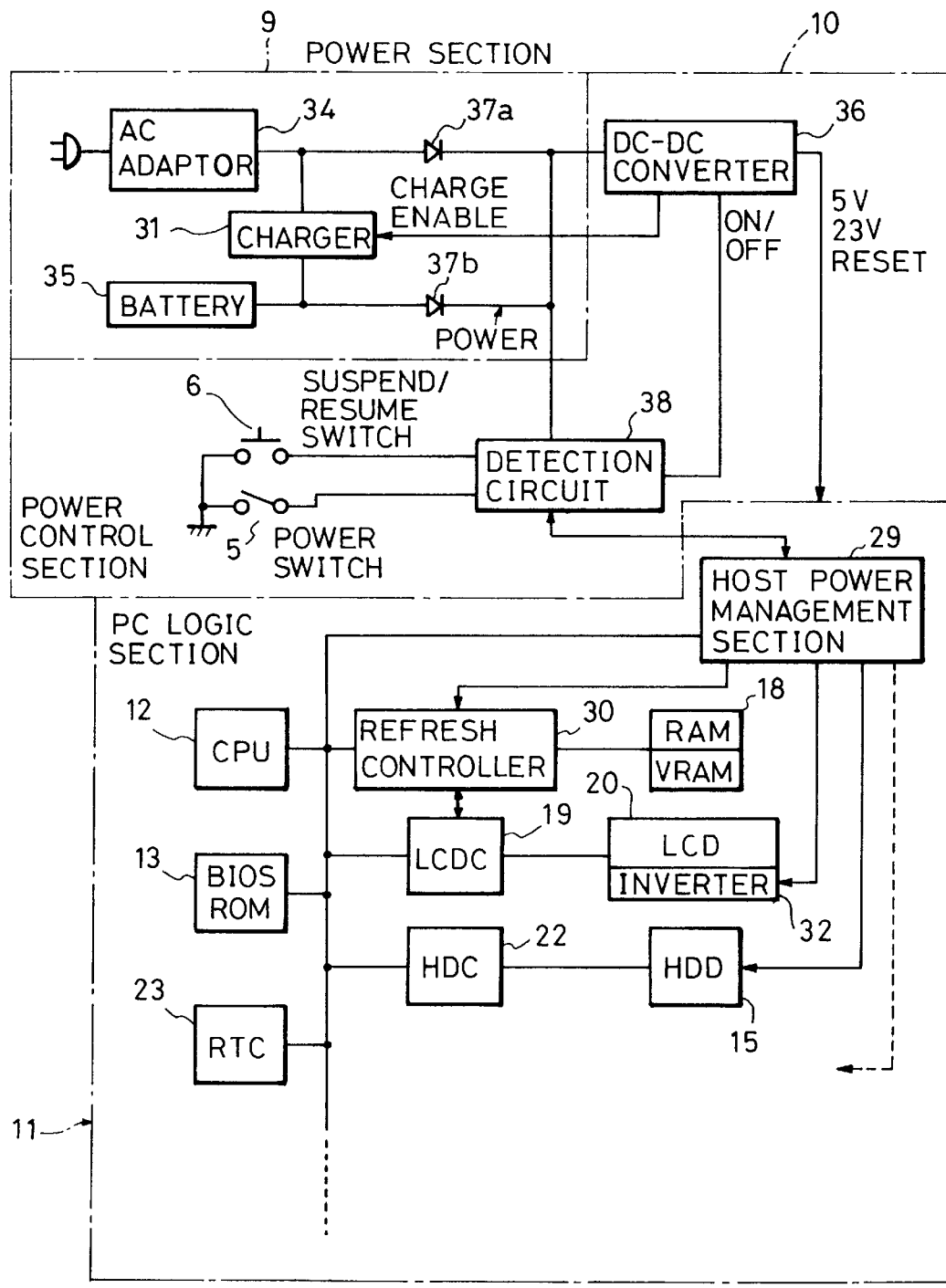
FIG. 2 is an outlined block diagram of a personal computer.

FIG. 2 is an outlined block diagram of the PC 1. The PC 1 includes a power section 9, a power control section 10, and a PC logic section 11 performing the main control.

The power section 9 comprises an AC adaptor 34, which is an external device; a chargeable, secondary battery 35, such as a Ni—Cd battery; and a charger 31 which controls charging of the secondary battery 35. An output combined through diodes 37a and 37b is supplied to the power control section 10.

The power control section 10 has a detection circuit 38 for detecting the operations of the power switch 5 and the suspend SW 6 and controls a DC—DC converter 36 serving as a power circuit with the states of the switches and a control signal sent from the PC logic section 11. The DC—DC converter 36 receives the power control signal from the power section 9 and generates a body power such as a main power of 5 V for the PC logic section 11, a power of 23 V for driving the display section 7, and a reset signal.

The charger 31 is controlled such that it is enabled while the power to the PC logic section 11 is off.

In this embodiment, when the power switch 5 is turned off, the DC—DC converter 36 is turned on and the PC 1 is set to the operation condition. The power switch 5 is a slide switch and the suspend SW 6 is a push switch of a standard type.

Figure 3:
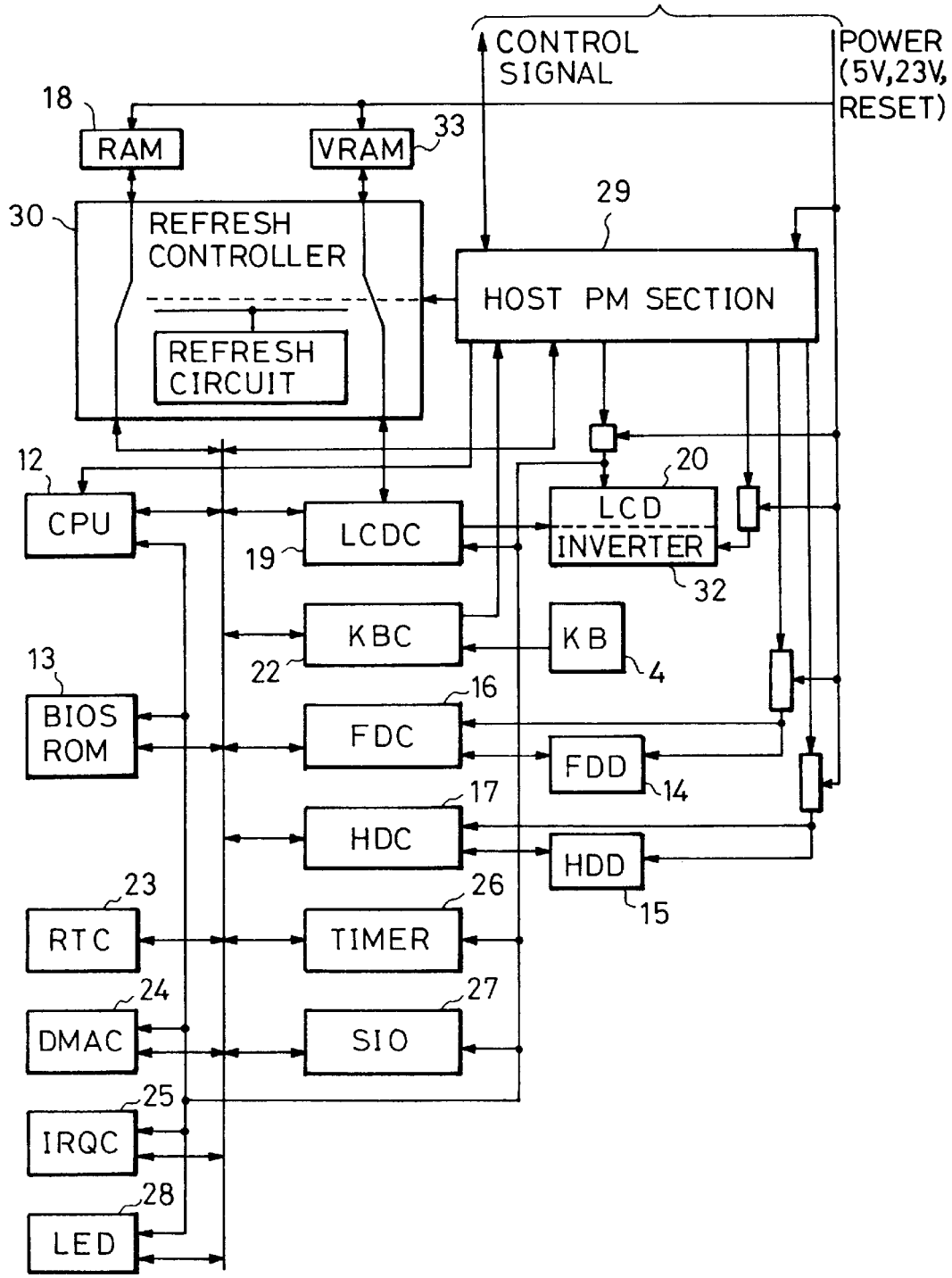
FIG. 3 is an outlined block diagram of a PC logic section 11.

FIG. 3 is an outlined block diagram of the PC logic section 11.

The PC logic section 11 comprises a central processing unit (hereinafter called a CPU) 12 which performs the main control, and a read-only memory (hereinafter called BIOS ROM) 13 which stores the basic control procedure of the PC logic section 11. The PC logic section 11 reads an application program from a floppy disk drive (hereinafter called FDD) 14 and a hard disk (hereinafter called HDD) 15 through a floppy disk controller (hereinafter called FDC) 16 and a hard disk controller (hereinafter called HDC) 17, and executes the program with a system memory (hereinafter called RAM) 18. Characters and other items are displayed on a liquid-crystal display unit (hereinafter called LCD) 20 using a LCD controller (hereinafter called LCDC) 19. Key entry at the keyboard 4 is handled with a keyboard controller (hereinafter called KBC) 22. A real-time clock (hereinafter called RTC) 23 indicates the current elapsed time. It operates with a dedicated battery such as a lithium battery even when the system power is turned off. The RTC 23 also has an area for storing data indicating the storage position of the HDD 15 where suspend data is stored. It is clear that this area in the RTC 23 can be replaced with another area in nonvolatile memory.

A DMA controller (hereinafter called DMAC) 24 transfers data without the intervention of the CPU at high speed between one memory and another memory or between memory and an input/output (hereinafter called I/O) unit. An interrupt controller (hereinafter called IRQC) 25 receives interrupts from I/O units and handles them according to the already-determined priority. A timer 26 has several channels of free-running timers and performs various types of time control. A serial interface (hereinafter called SIO) 27 for connecting to external units and a light-emitting diode (hereinafter called LED) 28 for reporting the operation condition to the user are also provided.

In addition, the PC logic section 11 includes a host power management section (hereinafter called a host PM section) 29 and a memory refresh controller 30. The host PM section 29 performs various kinds of control. For example, it turns on and off an inverter circuit 32 serving as a power to the fluorescent display unit mounted in the LCD 20, supplies power to the FDD 14 and HDD 15, performs time control of power supplied to devices other than the RAM 18 and a read-write-enabled memory 33 for display (hereinafter called VRAM), controls the clocks for the CPU 12, and controls the power control procedure for the suspend/resume conditions. The refresh controller 30 switches between the RAM 18 and the VRAM 33 while the CPU clock is operating with a direction signal from the host PM section 29 and refreshes them.

Figure 4:
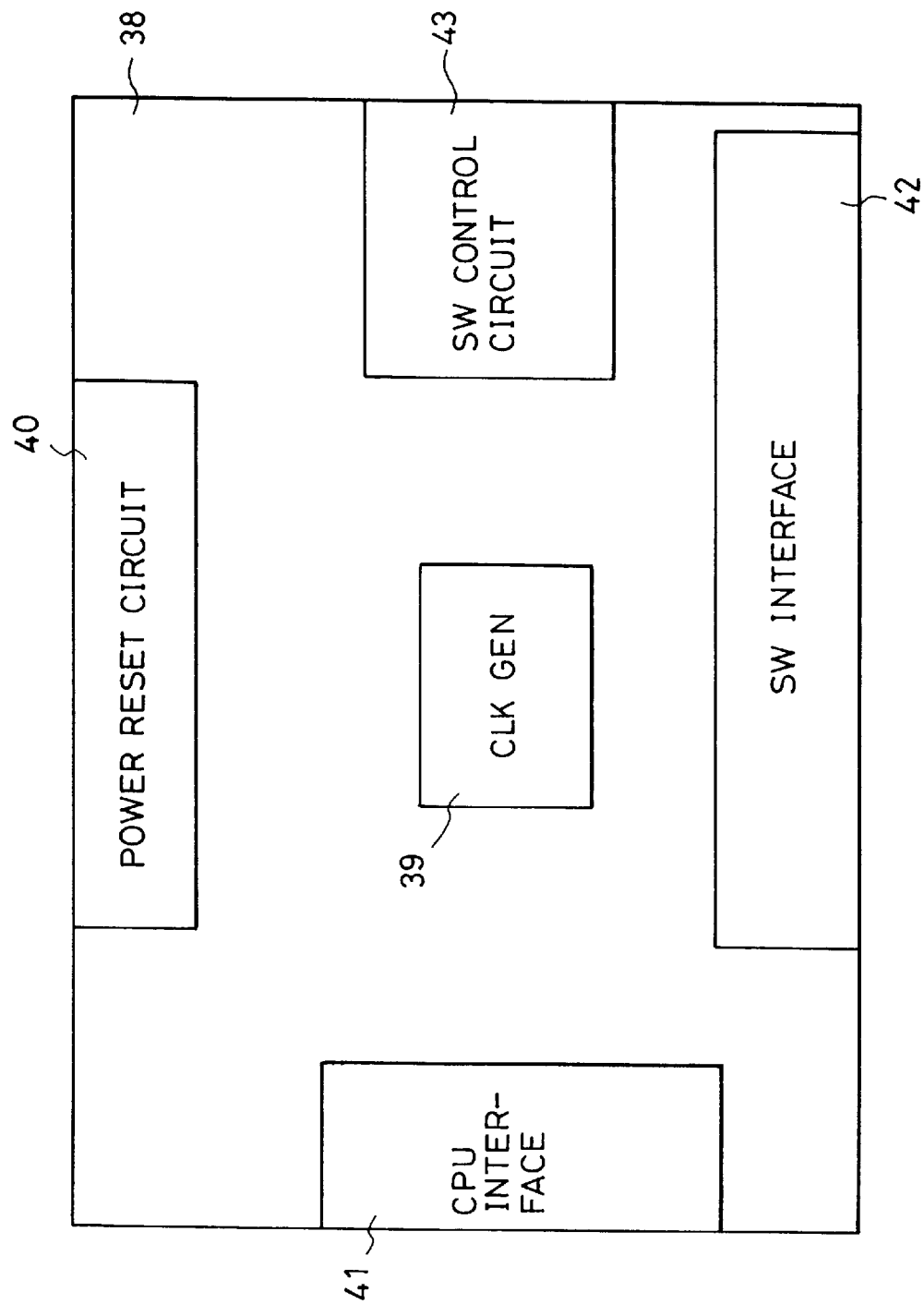
FIG. 4 is a view showing the configuration of a detection circuit 38.

FIG. 4 is a view showing the configuration of the detection circuit 38.

The detection circuit 38 comprises a clock generator (hereinafter called CLK GEN) 39 serving as an oscillating circuit, a power reset circuit 40, a CPU interface 41 for exchanging signals with the PC logic section 11, a switch (SW) interface 42 for detecting the operations of the switches 5 and 6, and a switch (SW) control circuit 43 for controlling the DC—DC converter 36. The CLK GEN 39 supplies the clock such as the CLK signal to control blocks located in the detection circuit 38.

Figure 5:
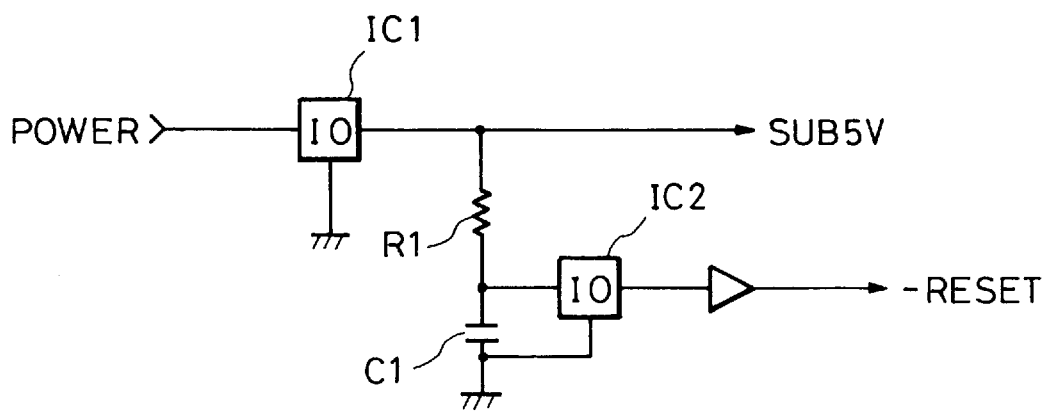
FIG. 5 is a view showing the configuration of a power reset circuit 40.

FIG. 5 is a view showing the configuration of the power reset circuit 40. The power reset circuit 40 has a stabilized power circuit IC1 and a power detection circuit IC2. The power circuit IC1 stabilizes the power from the AC adaptor 34 and that from the battery 35 which is combined with the diodes 37a and 37b, and supplies a power of 5 V, SUB5V, to the detection circuit 38. The power detection circuit IC2 keeps the output signal to low until the power voltage reaches a specified voltage at power on. Therefore, the -Reset signal keeps the detection circuit 38 in the reset condition for the time determined by the resistance of a resistor R1 and the capacitance of a capacitor C2, namely until the SUB5V power becomes stable.

Figure 6:
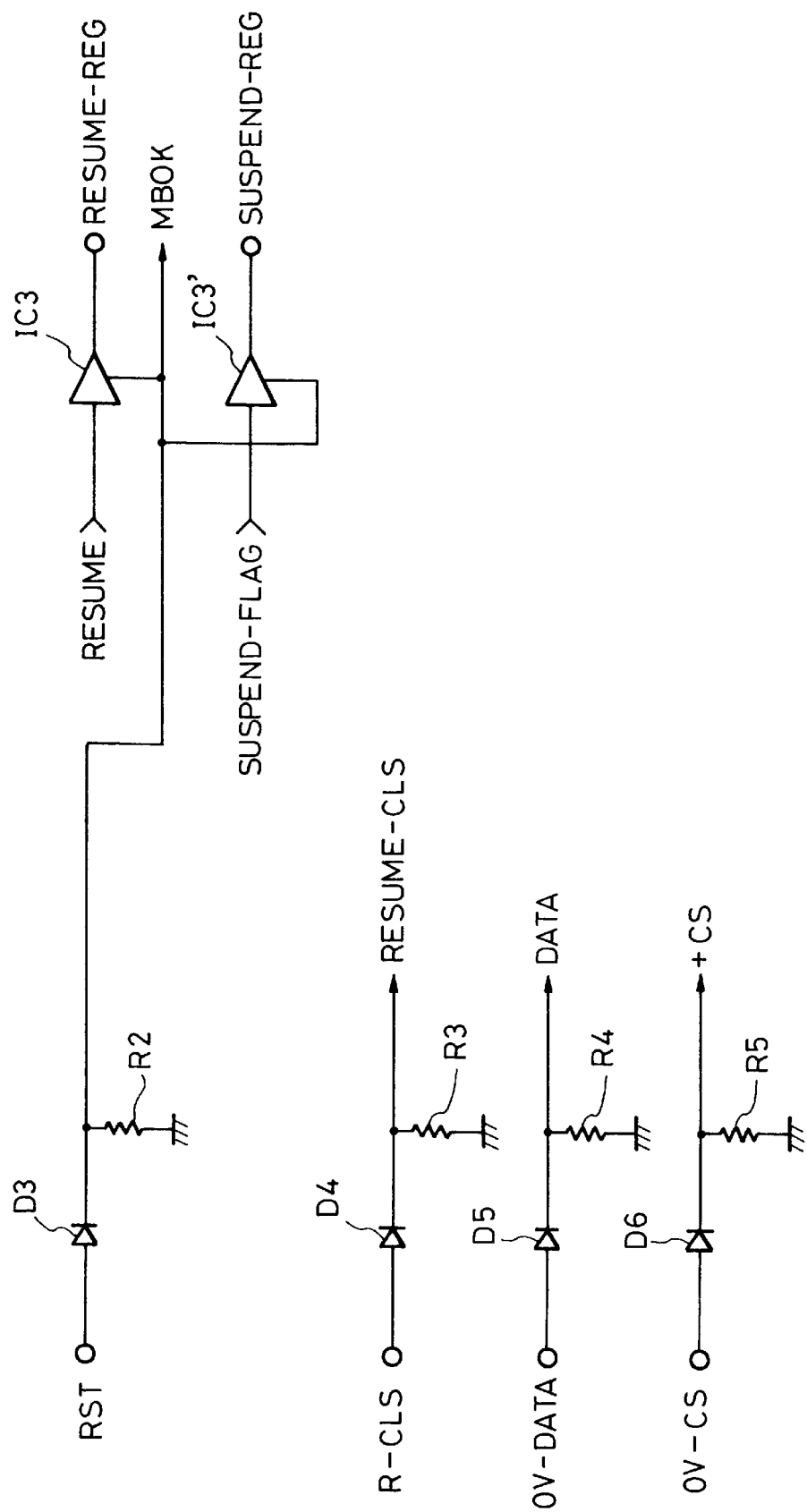
FIG. 6 is a view showing the configuration of a CPU interface 41.

FIG. 6 is a view showing the configuration of the CPU interface 41. The CPU interface 41 acts as an interface for exchanging signals with the PC logic section 11. The interface is provided with buffering components, diodes D3 to D6, resistors R2 to R5, and tristate ICs IC3 and IC3' in order to stabilize signals even when the main power is not supplied to the PC logic section 11 in a low-power condition.

The detection circuit 38 has the RST signal (called the MBOK signal in the detection circuit) sent from the PC logic section 11 as a power monitoring signal, which is a reset signal for the body, the r-CLS signal (called the resume-CLS signal in the detection circuit) acting as a setting signal for various registers in the detection circuit 38, the OV-CS (called the +CS signal in the detection circuit), and the OV-data (called the Data signal in the detection circuit) acting as the data line for the OV-CS signal.

The detection circuit 38 also has the resume-Reg signal (called the resume signal in the detection circuit) for reporting the condition of the detection circuit 38 to the PC logic section 11 and the suspend-Reg signal (called the suspend-Flag signal in the detection circuit).

Figure 7:
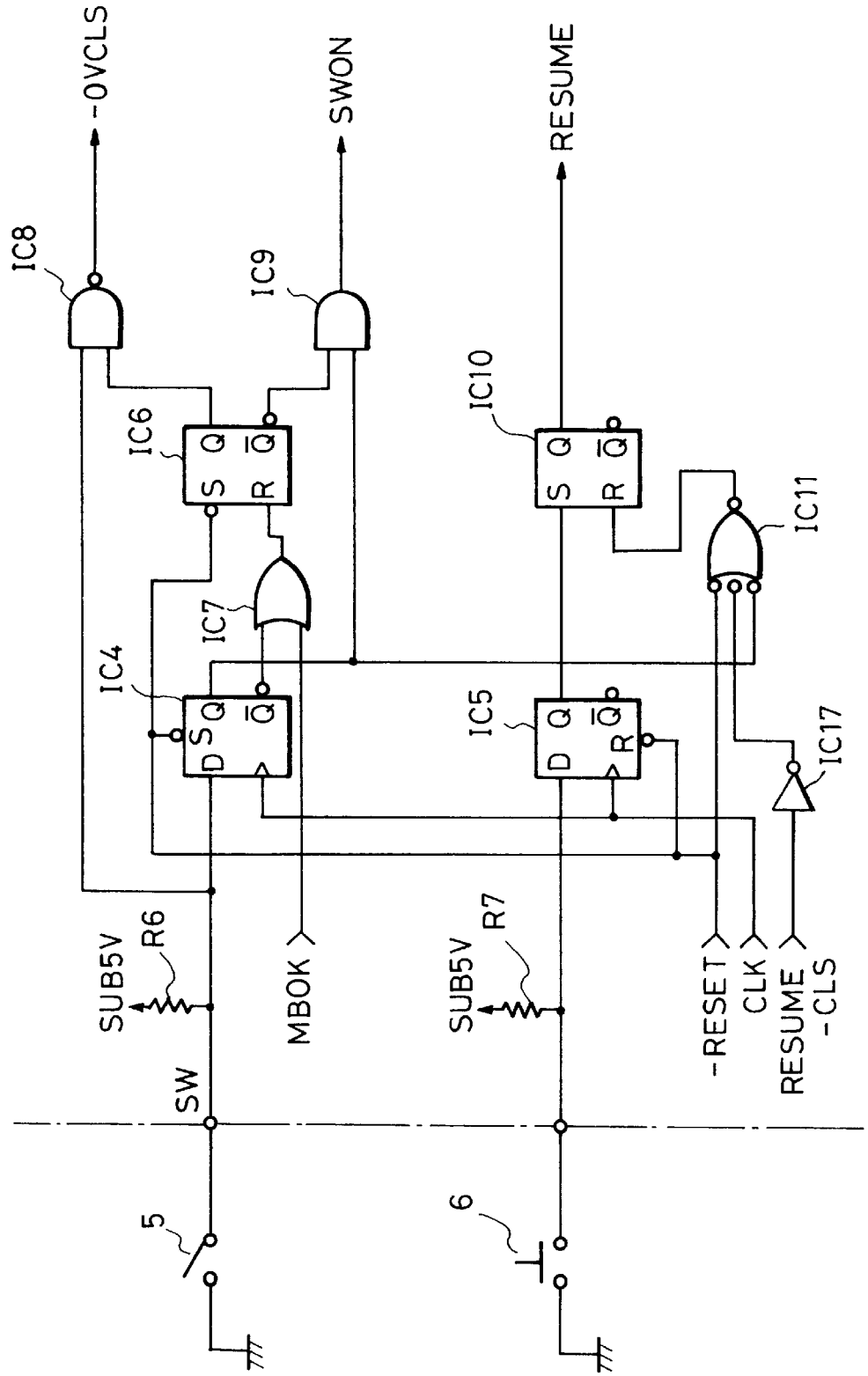
FIG. 7 is a view showing the configuration of a switch interface 42.

FIG. 7 is a view showing the configuration of the SW interface 42. The SW signal connected to the power switch 5 is pulled up by a resistor R6, is input to the flip-flop IC4, and is used to generate a power switch detection signal, which detects power on, with the synchronization clock (CLK) generated by the CLK generator 39. The line from the suspend SW 6 is pulled up by a resistor R7, is connected to a flip-flop IC5, and then is used to generate the suspend SW detection signal, which detects a suspend-SW input, with the CLK signal. A set-reset flip-flop IC6 is reset by the signal output from an OR gate (IC7) which receives a body-operation enabling signal (MBOK) and the power-on signal. A NAND gate IC8 and an AND gate IC9 receive signals from IC4 and IC6 and generate signals for controlling the switch (SW) control circuit 43, the -OVCLS and SWON signals.

A set-reset-type flip-flop IC10 generates a resume enabling signal "RESUME" for controlling the SW control circuit 43. IC10 is set with a signal sent from the suspend SW 6 through IC5, and reset with a signal sent from the NAND gate IC11. This means that IC10 is reset by any of the reset signal—RESET, the inverted signal (inverted in IC17) of the RESUME-CLS signal, and the power switch detection signal (sent from IC4). When the power switch 5 is turned on (PC1 is off), the state of the suspend SW 6 is not detected even if the suspend SW 6 is pressed because IC10 is being reset.

Figure 8:
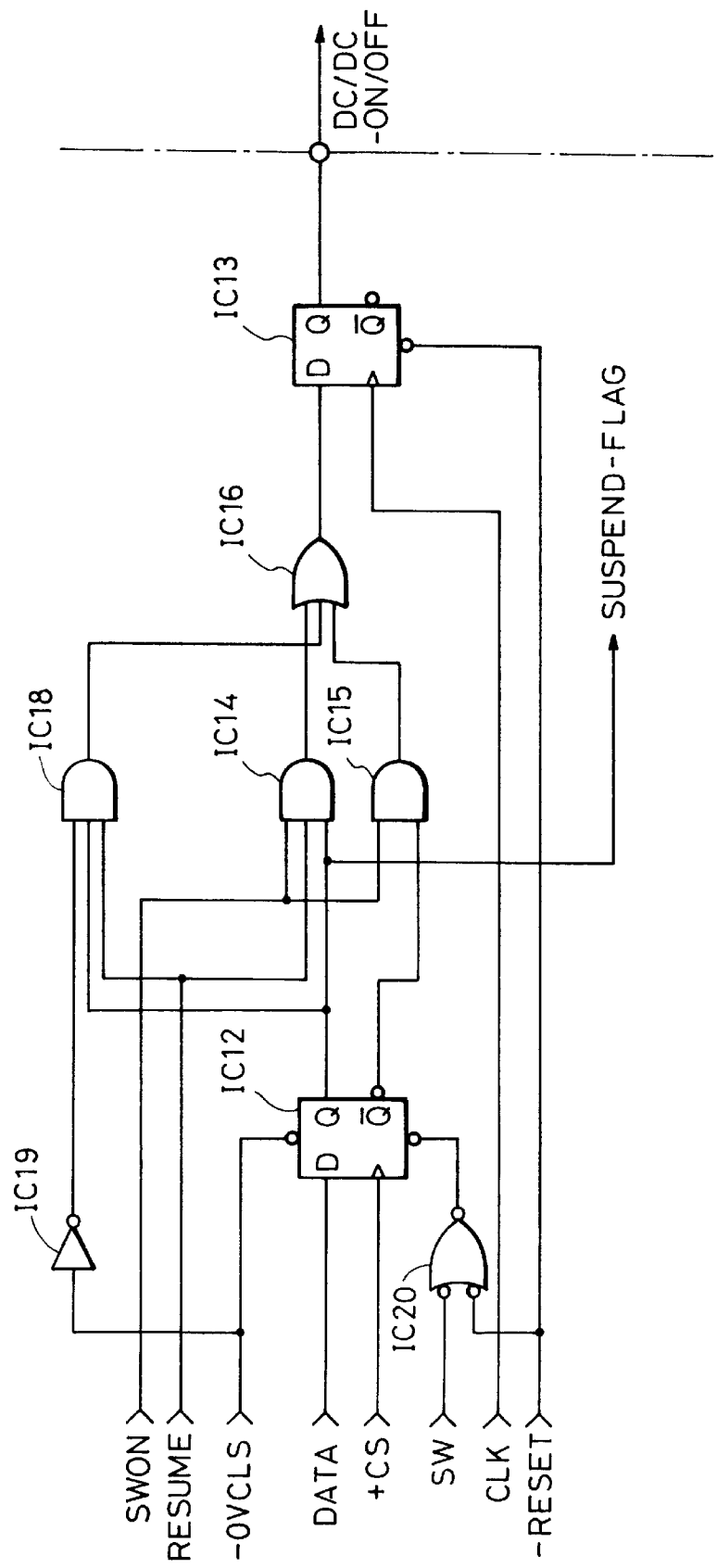
FIG. 8 is a view showing the configuration of a switch control circuit 43.

FIG. 8 is a view showing the configuration of the SW control circuit 43. A flip-flop IC12 receives control signals (data and +CS) from the body and generates the suspend-Flag signal indicating whether the PC 1 is suspended or not as a result of operation of the suspend SW 6. The reset input of IC12 is connected to the gate IC20. IC12 is reset with either of the -RESET signal and the SW signal. Therefore, when the power switch 5 is turned on (PC1 is off), the SUSPEND-FLAG flag is reset.

A flip-flop IC13 latches the signal combined by IC16 from the signals sent from gates, IC14, IC15, IC18, and IC19, with the synchronization clock CLK generated by the CLK generator 39 and generates the DC—DC—ON/OFF signal for controlling the operation of the DC—DC converter 36.

Under this configuration, the initial operation of each section depending on the state of the power switch 5 when a battery is mounted will be described below.

When the battery 35 is turned on, the power is supplied to IC1 and the power to the detection circuit, SUB5V, is supplied. IC2 sends the -Reset signal to each section and keeps the reset condition for the time T determined by the resistor R1 and the 25 capacitor C1.

The CLK GEN 39 starts oscillating within the time T and supplies the synchronization clock CLK to each section.

When the power SW 5 is off (the PC 1 is on), the SW signal, which is an input to IC4, is set to high by resistor R6 as soon as SUB5V is supplied. The output signal of IC9, SWON, becomes low because IC4 and IC6 are set by the -Reset signal. The output signal of IC8, -OVCLS, is also set to low.

The push-type suspend SW 6 is normally set short-circuited, set to low. After the -RESET signal is released, IC5 latches an input signal at the rising edge of the synchronization clock CLK. Except when the user operates the switch (resume request or suspend request), IC 5 outputs a low signal.

The RESUME signal output from IC10 is reset by any of the -RESET signal generated at the rising edge of SUB5V, the signal indicating that the power switch 5 is on (PC1 is off) and the R-CLS (RESUME-CLS) signal sent from the PC1. When the battery is replaced, IC10 is reset by the -RESET signal, and the RESUME signal becomes low. The DC—DC—ON/OFF output signal of IC13, which is a control signal for the stabilized power DC—DC converter 36 for the body, is set to low because IC12 is set by the -OVCLS signal after the -Reset signal is released, and the resume signal is reset. Even when the battery is replaced while the power switch 5 is off (the PC 1 is on), the output signal keeps the stabilized power 36 for the body in the off state.

When the user operates the switch 6 (for resume request), IC5 latches a high signal at the rising edge of the synchronization clock CLK and IC10 is set such that the RESUME signal goes high. Therefore, IC18 outputs a high signal to make the DC—DC—ON/OFF signal, a signal controlling the stabilized power supply 36 for the body, high. When the output of this power supply 36 is stabilized, the RST signal (MBOK) sent from the body PC1 goes high, resetting IC6. Then, IC18 outputs a low signal. At the same time, IC14 outputs a high signal, maintaining the high state of the DC—DC—ON/OFF control signal for the stabilized power supply 36.

This means that the power supply is steadily kept on, which is the electrical condition for resume operation. When IC12 is set by the PC1, the stabilized power supply 36 is also turned on with the operation of the suspend SW 6.

The initial operation of each section when the battery is replaced while the power switch 5 is on (the PC 1 is off) will be described below.

Since the power switch 5 is on (the PC 1 is off) when the battery is mounted in the body, the signal input to IC4 becomes low when SUB5V is supplied. After IC4 is released from the set condition by the -Reset signal, IC4 latches a low signal at the rising edge of the synchronization signal CLK and IC6 and IC10 are reset. While the -Reset signal is being set to low, IC12 and IC13 are in the reset state. Since IC12 continues being reset by the SW signal after the -Reset signal is released, the DC—DC—ON/OFF signal, which is a control signal for the stabilized power 36, is kept low, holding the stabilized power 36 in the off condition (the PC 1 is off). When the power switch 5 is turned on (PC1 is off), the detection of the suspend switch 6 is disabled and the flag (suspend flag) indicating that IC12 is suspended is reset at the same time. Then, the body PC1 is set ready for cold booting by the switch 5.

Figure 9:
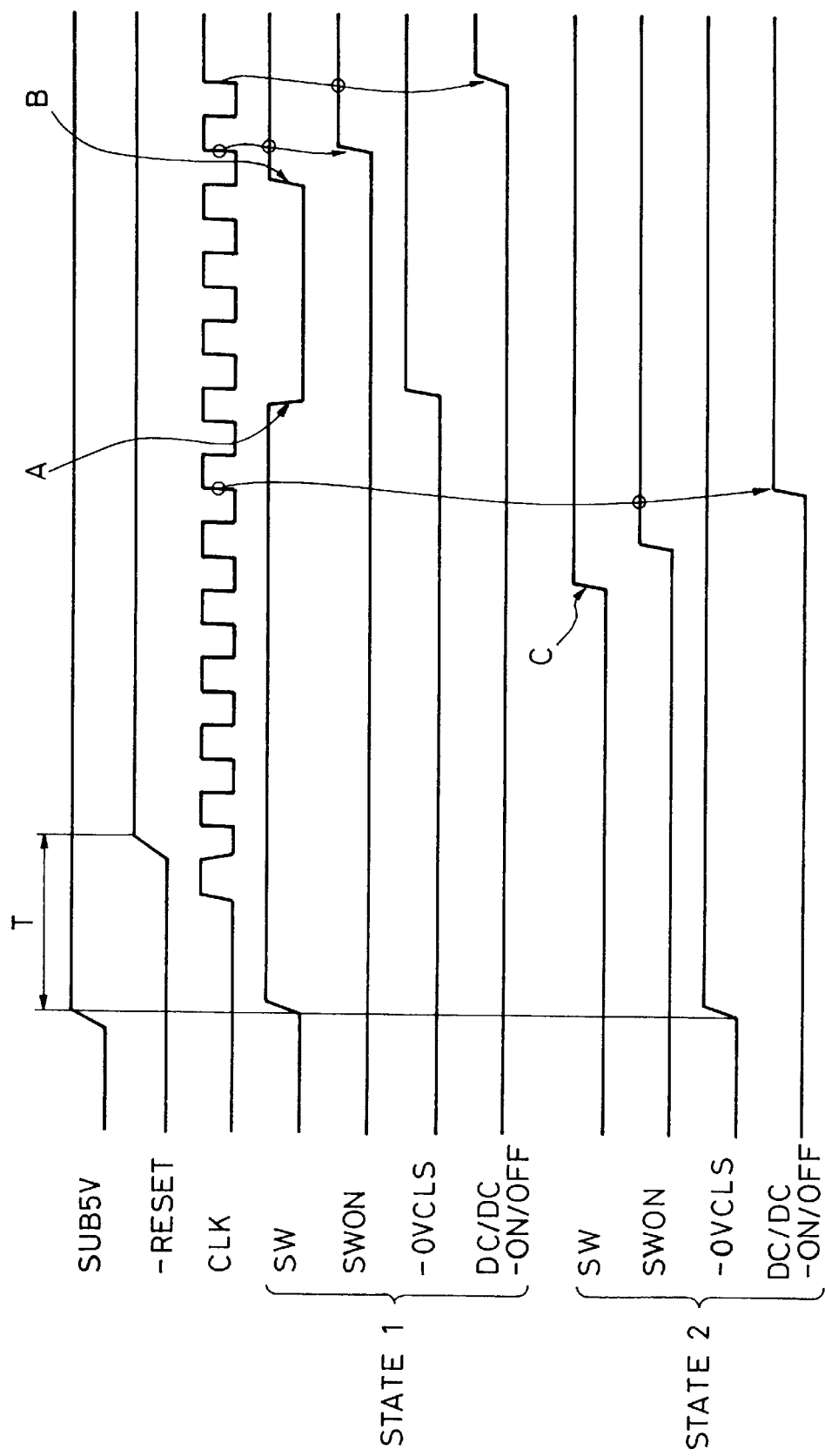
FIG. 9 is a timing chart of the main signals in the detection circuit 38.

FIG. 9 is a timing chart of the main signals in the detection circuit 38. In a state 1 and a state 2 shown in FIG. 9, the conditions of each signal are shown with the horizontal axis set to the time axis and the battery mounted in the body. The state 1 corresponds to the condition in which the power switch 5 is turned on (the PC 1 is off) from the off state (the PC is on) and then the switch 5 is turned off (the PC is on) again. The state 2 corresponds to the condition in which the power switch 5 is turned off from the on state (the PC changes from off to on).

As described above, when the battery is mounted to the body, the power is supplied to IC1 and a power of SUB5V is supplied to the detection circuit. IC2 sends the -Reset signal to each section and maintains the reset condition for the time T determined by the resistor R1 and the capacitor C1. The CLK GEN 39 starts oscillating within the time T and supplies the synchronization clock CLK to each section. Each section starts its initial operation.

In the state 1, the timing chart starts at the time when the power switch 5 is off (the PC 1 is on). The RESUME signal output from IC10 is reset by the -RESET signal and becomes low. After the reset state is released, IC12 is set by the -OVCLS signal. The DC—DC—ON/OFF signal, a control signal for the stabilized power 36, is set to low to turn off the power.

Point A indicates that the user turns on the power switch 5 from the off state (the PC1 changes from on to off). Therefore, the SW signal goes low and IC6 is reset. The -OVCLS signal goes high. IC12 is reset by the SW signal. Since the SWON signal output from IC9 does not change, however, the stabilized power 36 keeps its state, in the off condition.

Point B indicates that the user turns on the body power from the off state (the power switch 5 changes from on to off). The SW signal goes high. IC4 latches the state of the power switch 5 at the rising edge of the synchronization signal CLK and turns to high, setting the SWON signal to high. Therefore, IC15 outputs a high signal. IC13 latches a high signal at the rising edge of the synchronization signal CLK to turn on the stabilized power 36.

In the state 2, the timing chart starts at the time while the power switch 5 is on (the PC 1 is off) when the battery is turned on. Each section is initialized when a power of SUB5V is supplied. Since IC12 and IC13 are being reset within the reset period, the DC—DC—ON/OFF signal, a control signal for the stabilized power 36, is kept low, maintaining the stabilized power 36 in the off state.

Point C indicates that the user turns on the body power from the off state (the power switch 5 changes from on to off). The SW signal goes high. IC4 latches the state of the power switch 5 at the rising edge of the synchronization signal CLK and turns to high, setting the SWON signal to high. Therefore, IC15 outputs high. IC13 latches a high signal at the rising edge of the synchronization signal CLK and sets the DC—DC—ON/OFF signal to high, turning on the stabilized power 36.

Figure 10:
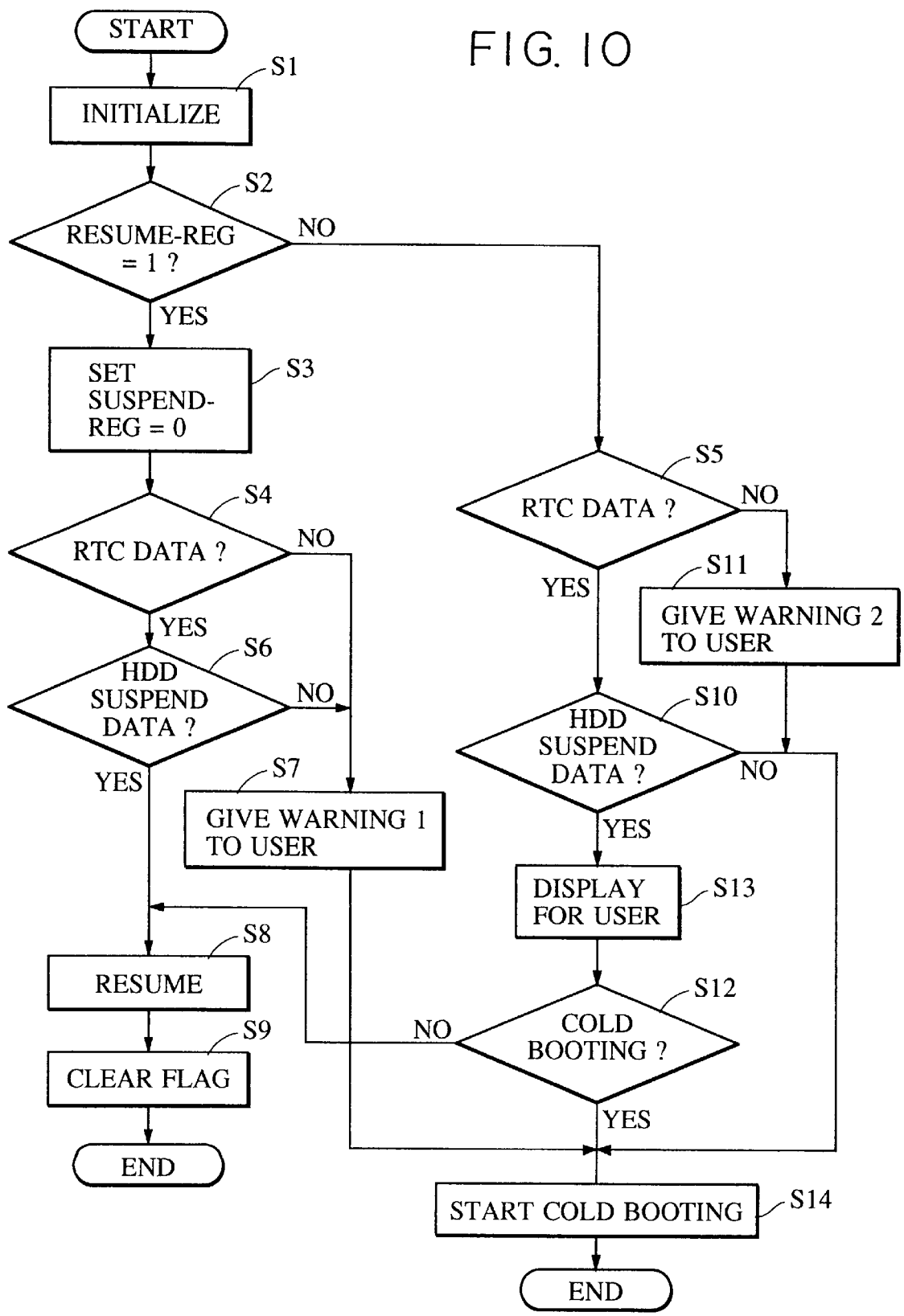

FIG. 10 is a flowchart indicating the system operation at power on. When the DC—DC converter 36 is turned on according to the power switch 5 or the suspend SW 6, the PC logic section 11 performs initialization of each register belonging to the section according to the contents of the BIOS ROM 13 in process step S1. Then, the CPU12 reads a control signal, resume-Reg, output from the power control section 10 through the host PM section 29, and checks which switch was used for turning on the power at decision step S2. When it is determined that the suspend switch 6 was used for turning on the power, the flow proceeds to process step S3. Otherwise, the flow proceeds to decision step S5.

When the SUSPEND-FLAG is high, it is determined that the switch 6 is used for turning on the power. In this case, IC14 outputs a high signal to make the DC—DC—ON/OFF signal, a control signal for the stabilized power 36, high. In step S3, IC12 is cleared in order to transfer the control of the stabilized power 36 to the power switch 5.

The CPU12 checks the data at RTC23 indicating the position where suspend data is stored in the decision step S4. When the data exists at RTC23, the HDD 15 is referred to in decision step S6. When such data is not stored, the flow proceeds to process step S7 which displays a warning to the user. Then, the flow proceeds to process step S14 for cold booting.

Process step S7 displays the following:

"NO SUSPEND DATA Cold booting"

When the suspend data is determined to be appropriately stored in decision step S6, the CPU12 writes the suspend data into the main memory and display data and register information into each device in order to return to the state before the suspension in process step S8. Then a positive-logic pulse is added to the RESUME-CLS signal to reset IC10 in order that a user's suspend request is ready to be received from the switch 6.

The CPU12 checks the data at RTC23 indicating the position where suspend data is stored in decision step S5. When the data exists at RTC23, the HDD 15 is referred to in decision step S10. When such data is not stored, the flow proceeds to process step S11 which displays a warning indicating that memory at RTC23 and dedicated battery are defective and prompting the user to specify the setting for storing data for suspension in the HDD15. Then, the flow proceeds to process step S14 for cold booting.

Process step S11 displays the following:

"RTC or LITHIUM BATTERY IS DEFECTIVE SPECIFY SETTING FOR ENABLING SUSPENSION Cold booting"

When the position where suspend data is stored is found in decision step S5, the suspend data is referred to in decision step S10. When it is determined that the data is correctly stored, the CPU12 indicates to the user that there is not-yet-handled data in process step S13. Then the flow proceeds to decision step S12. If the suspend data is not correctly stored, the flow proceeds to process step S14 and cold booting is performed.

Process step S13 displays the following:

"RESUME THE SYSTEM? YES→Y NO→N"

When the user selects cold booting in decision step S12, the flow proceeds to process step S14 and processing advances according to the contents of the BIOS ROM 13. When the user does not select cold booting, the flow proceeds to process step S8. The suspend data is restored to the main memory and display data and register information is written into each device in order to return to the state before the suspension. In process step S9, IC12, which holds the status information at the suspension, is preset. Then, IC10 is cleared.

Tables 1 and 2 show the system operation at power on. These tables indicate that the system operates differently depending on the operations of the switches, the power switch and suspend SW. Sxx shown in these tables refer to the step numbers shown in FIG. 10.

Table 1 lists the conditions at the time when the power switch 5 is turned off from the on state (PC1 is turned on from the off state) or the suspend SW is operated after the battery has been replaced.

TABLE 1

| Conditions (Initial State: Power Switch 5 being on (PC1 being off)) | | | |
|---|---|---|---|
| SUSPEND-FLAG | Suspend data | Power switch on | Suspend SW on |
| 0 | Not provided | Cold booting | Power off |
| 0 | Provided | User selection (S12) | Power off |
| 1 | Not provided | Not applicable | Not applicable |
| 1 | Provided | Not applicable | Not applicable |

Table 2 lists the conditions at the time when the power switch 5 is turned on from the off state and then is turned off again (PC1 is turned off from the on state and then is turned on), or the suspend SW is operated after the battery has been replaced.

TABLE 2

Conditions (Initial State: Power Switch being off (PC1 being on))

| SUSPEND-FLAG | Suspend data | Power switch off to on | Suspend SW on |
|---|---|---|---|
| 0 | Not provided | Not applicable | Not applicable |
| 0 | Provided | Not applicable | Not applicable |
| 1 | Not provided | Cold booting | User warning (S7) |
| 1 | Provided | User warning (S12) | Resume |

Figure 11:
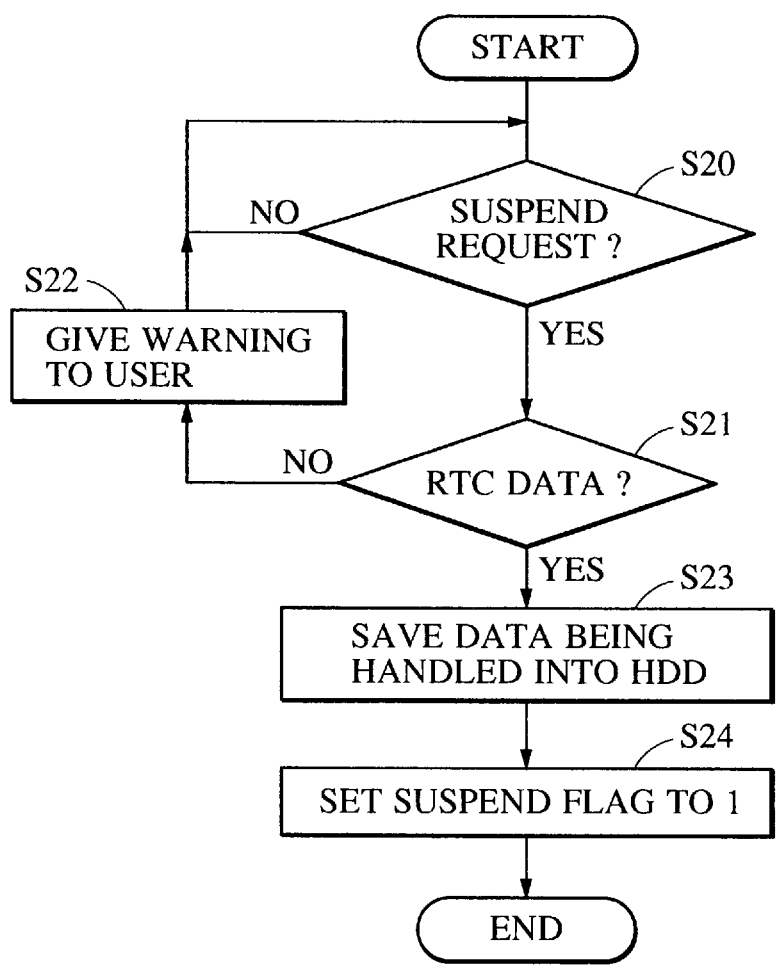
FIG. 11 is a flowchart showing the system operation at suspension.

FIG. 11 is a flowchart indicating the system operation at suspension. The resume-reg signal is monitored at decision step S20. When the user presses the suspend SW, the flow proceeds to decision step S21. Decision step S21 checks whether the HDD 12 already has an area for suspend data. When the memory area is not assigned, the flow proceeds to process step S22 to display that condition. When the area has been assigned, the flow proceeds to process step S23 for suspension.

In process step S23, all data in the main memory, display memory and registers are saved in the HDD at the positions indicated by the data stored at RTC23 when a suspend request is issued.

The CPU sequentially controls the R-CLS, OV-data and OV-CS control signals through the host PM section in process step S24. A positive-logic pulse is sent through the R-CLS signal to reset IC10 in order that a user's resume request is ready to be received from the suspend switch 6. Then, to set the suspend-flag, which shows that the body has been suspended, data is written into IC12 with the OV-data and OV-CS signals. Since the RESUME signal has already been set low, IC15 goes low from the on state when the suspend flag is set to high. Therefore, while the PC1 maintains its on state, the power control section turns off the power.

In this embodiment, the present invention is applied to the notebook-type personal computer. It is clear that the present invention can be applied to similar apparatuses, such as a desk-top personal computer and a word processor having a suspend function. The present embodiment only describes the personal computer with an external AC adaptor. The present invention can be applied to a system apparatus having a built-in AC adaptor.

Second embodiment

Figure 12:
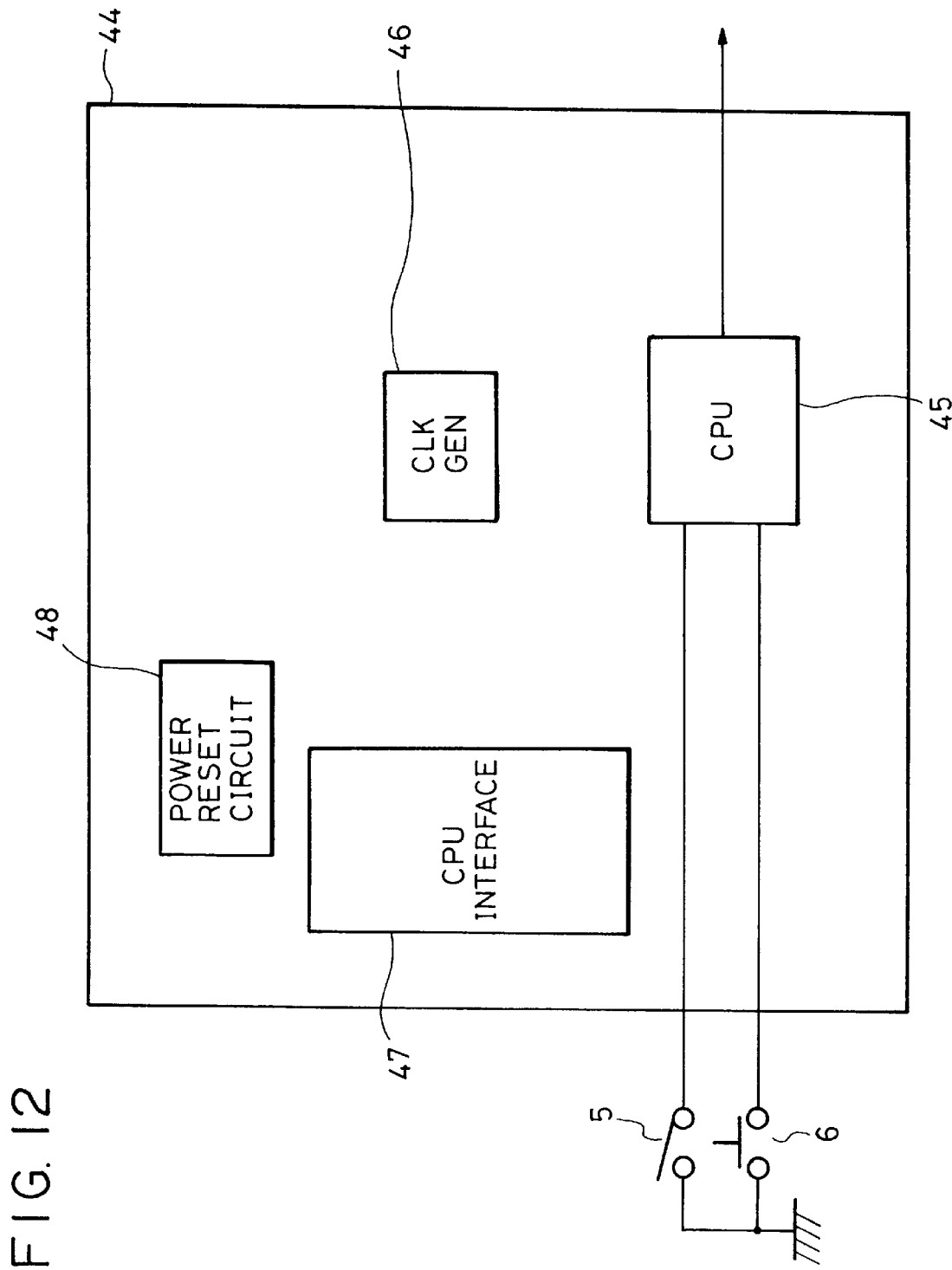
FIG. 12 is a view showing the configuration of a detection circuit 44 according to a second embodiment.

FIG. 12 is a view showing the configuration of a detection circuit 44, which is used as a substitute for the detection circuit 38 described before in a personal computer according to a second embodiment.

The detection circuit 44 comprises a CPU 45, a one-chip microcomputer in which internal RAM and program ROM are built; a clock generator 46 (CLK GEN) for generating a clock driving the CPU 45; a power reset circuit 48 serving as a supplementary power generator and a reset circuit; and a CPU interface 47 connecting to the PC logic section 11.

Detecting the operations of the power switch 5 and the suspend SW 6, the CPU 45 controls the DC—DC converter 36 according to the states of the switches. State flags, such as the suspend-Reg and resume-Reg flags, described in connection with the first embodiment can be exchanged through the data bus and the CPU interface 47.

The second embodiment describes the one-chip microcomputer in which internal RAM and program ROM are built. It is needless to say that the present invention can be applied to a one-chip microcomputer having its RAM and program ROM outside the chip and to a one-chip microcomputer which controls all power management.

Third embodiment

Figure 13:
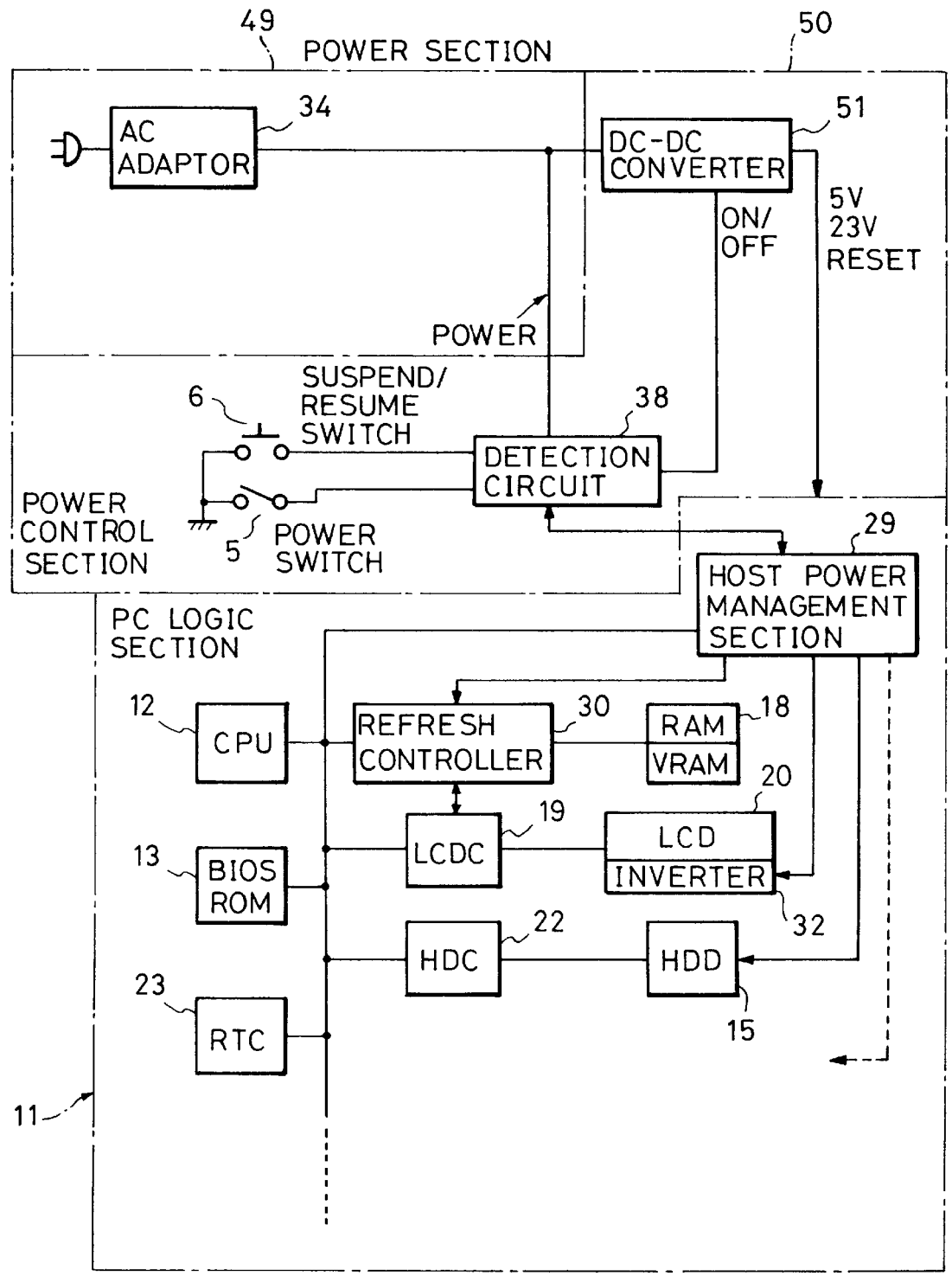
FIG. 13 is a view showing the configuration of a personal computer 1 according to a third embodiment.

FIG. 13 illustrates the configuration of a personal computer 1 according to a third embodiment. The first embodiment describes the personal computer operating with the AC adaptor and the internal battery. In the third embodiment, the PC 1 uses one external power supply. The PC 1 comprises a power section 49, a power control section 50, and a PC logic section 11 performing the main control. The power section 49 comprises an external AC adaptor 34 and supplies its output to the power control section 50. The power control section 50 has a detection circuit 38 for detecting the operations of a power switch 5 and a suspend/resume switch 6 and controls a DC—DC converter 51 according to the states of the switches and control signals sent from the PC logic section 11.

The DC—DC converter 51 receives power from the power section 49 and generates power of 5 V serving as the main power for the PC logic section 11, power of 23 V for driving a display section 7, and a reset signal.

As described above, it is obvious that the present invention does not restrict the types of power to be used for driving. The present invention can also be applied to an information apparatus which uses a primary battery such as an alkaline-manganese battery.

As described above in connection with the preferred embodiments, suspend data can reliably be stored and the apparatus can be restored positively.

Even if suspend data is destroyed due to erroneous user operations or battery exhaustion, the data can be recovered.

By storing suspend information into non-volatile memory, resume operation can reliably be executed and memory failure at battery replacement can be reported to the user.

In addition, the apparatus is prevented from operating against the user's intention, such as accidental system power input and accidental resume operation.

As described above, it is clear that the reliability of an information apparatus improves in these embodiments.

Therefore, the present invention improves the reliability of an information apparatus at battery replacement.

What is claimed is:

1. Apparatus for supplying power from a battery to an electronic circuit in an information processing device containing a power switch according to the state of said power switch, said apparatus comprising:

connecting means for connecting said battery electrically to said electronic circuit;

supply means for supplying power from said battery to the electronic circuit according to the state of said power switch; and control means for controlling said supply means so as not to supply power to said electronic circuit by said battery for a predetermined duration following connection of said battery, even if the power switch is set to its on position when the battery is connected to said connecting means, said supply means being arranged to supply power when said power switch is turned off from an on position and then is turned on.

2. Apparatus according to claim 1, further comprising first memory means for storing first information indicating whether a suspension is directed, wherein said first memory means stores the first information according to the state of the power switch of said information processing apparatus when said battery is connected to said connecting means.

3. A power control apparatus according to claim 2, further comprising a second memory means for storing suspend information, wherein when said first memory means does not store the first information while said second memory means stores suspend information, and means for indicating the condition of said apparatus.

4. A power control apparatus according to claim 2, further comprising selection means for selecting between cold booting and suspend information recovery.

5. A method for supplying power from a battery to an electronic circuit in an information processing device containing a power switch, said method comprising the steps of:

connecting said battery electrically to said electronic circuit;

supplying power from said battery to said electronic circuit according to the state of said power switch; and controlling said supply means so as not to supply power to said electronic circuit by said battery for a predetermined duration following connection of said battery, even if the power switch is set to its on position when the battery is connected to said connecting means, said step of supplying power from said battery being carried out in a manner so as to supply power when said power switch is turned off from an on position and then is turned on.

6. A method according to claim 5, further comprising the steps of storing first information indicating whether a suspension is directed, said first information being stored according to the state of the power switch of said information processing apparatus when said battery is connected to said connecting means.

7. A method according to claim 6, further comprising the steps of:

storing suspend information;

preventing the storage of said first information while said suspend information is being stored; and indicating the condition of said apparatus.

8. A method according to claim 6, further comprising the step of selecting between cold booting and suspend information recovery.

9. An information processing apparatus having a power source, a power switch and an electronic circuit, comprising:

connecting means for connecting said power source electrically to said electronic circuit;

supply means for supplying power from said power source to said electronic circuit according to the state of said power switch; and control means for controlling said supply means so as to supply power from said power source to said electronic circuit, when said power switch is turned off from an on position after said power source is connected to said connecting means in the on position and then is turned on.

10. An information processing apparatus according to claim 9 further comprising storage means for storing information of said power switch position.

11. An information processing apparatus according to claim 10, further comprising:

memory means for storing information of the state of said electronic circuit before disconnecting said power source from said connecting means;

resume means for resuming said electronic circuit based on the position information and the state information.

12. An information processing apparatus according to claim 11, further comprising:

checking means for checking the state information; and determination means for determining whether it is necessary to recover the state information based on the result of checking by said checking means.

13. An information processing apparatus according to claim 9, wherein said power source is at least one of a battery and AC to DC converter.

14. A method for processing information in an apparatus having a power source, a power switch and an electronic circuit, said method comprising the steps of:

connecting said power source electrically to said electronic circuit;

supplying power from said power source to said electronic circuit according to the state of said power switch; and controlling said supply means so as to supply power from said power source to said electronic circuit, when said power switch is turned off from an on position after said power source is connected to said connecting means in the on position and then is turned on.

15. A method according to claim 14 further comprising the step of storing information of said power switch position.

16. A method according to claim 15, further comprising the steps of:

storing information of the state of said electronic circuit before disconnecting said power source from said connecting means; and resuming said electronic circuit based on the position information and the state information.

17. A method according to claim 16, further comprising the steps of:

checking the state information; and determining whether it is necessary to recover the state information based on the result of checking by said checking means.

18. A method according to claim 14, wherein said power source is at least one of battery and an AC to DC converter.

* * * * *